United States Patent [19]

Poll

[11] Patent Number: 5,209,956
[45] Date of Patent: May 11, 1993

[54] DECORATIVE PANEL AND A METHOD OF PRODUCING IT

[75] Inventor: Martin Poll, Fritzens, Austria

[73] Assignee: D. Swarovski & Co., Wattens, Austria

[21] Appl. No.: 908,857

[22] Filed: Jul. 1, 1992

Related U.S. Application Data

[63] Continuation of Ser. No. 714,201, Jun. 12, 1991, abandoned.

[30] Foreign Application Priority Data

Jun. 18, 1990 [DE] Fed. Rep. of Germany ....... 4019400

[51] Int. Cl.$^5$ .............................................. B32B 33/00
[52] U.S. Cl. ...................................... 423/13; 156/107; 264/261
[58] Field of Search ........................ 156/107; 264/261; 428/13

[56] References Cited

U.S. PATENT DOCUMENTS

| | | | |
|---|---|---|---|
| 1,634,251 | 7/1927 | Aronson | 428/31 X |
| 3,725,112 | 4/1973 | Hansen | 428/13 |
| 4,318,952 | 3/1982 | Barker et al. | 428/172 |
| 4,409,275 | 10/1983 | Samowich | 428/138 |
| 4,427,733 | 1/1984 | Poll et al. | 428/209 X |
| 4,499,126 | 2/1985 | Suzuki et al. | 428/13 |
| 4,718,963 | 1/1988 | Poll et al. | 428/79 X |
| 4,767,647 | 8/1988 | Bree | 428/13 X |
| 4,798,695 | 1/1989 | Redel | 156/107 X |

FOREIGN PATENT DOCUMENTS

| | | | |
|---|---|---|---|
| 541549 | 8/1982 | Australia . | |
| 0215324 | 8/1986 | European Pat. Off. . | |
| 2057148 | 5/1972 | Fed. Rep. of Germany . | |
| 2810371 | 6/1979 | Fed. Rep. of Germany . | |
| 3101181 | 1/1981 | Fed. Rep. of Germany . | |
| 3810002 | 3/1988 | Fed. Rep. of Germany . | |
| 1590116 | 5/1981 | United Kingdom | 428/31 |

*Primary Examiner*—Henry F. Epstein
*Attorney, Agent, or Firm*—Fish & Richardson

[57] ABSTRACT

A decorative panel comprising a lower carrier plate with a structured plastic layer applied thereto and bearing an effect layer, and an upper glass plate.

16 Claims, 1 Drawing Sheet

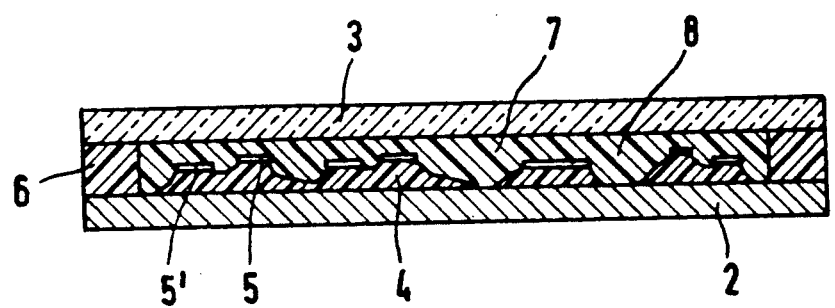

DECORATIVE PANEL AND A METHOD OF PRODUCING IT

This application is a continuation of U.S. Patent application Ser. No. 07/714,201, filed Jun. 12, 1991, now abandoned.

BACKGROUND OF THE INVENTION

1. Field of the Invention

The present invention relates to a decorative panel and a method of producing it.

2. Discussion of the Related Art

Various kinds of decorative panels are known, but there is a need for new decorative panels characterized by special esthetic effects.

The invention is therefore based on the problem of providing new decorative panels having special esthetic effects.

The invention is based on the finding that such new decorative panels can be created by disposing a structured plastic layer provided with color effects between a carrier plate and a glass plate.

The invention comprises a decorative panel comprising a lower carrier plate, a structured plastic layer applied thereto and bearing an effect layer, and an upper glass plate spaced therefrom.

The structured plastic layer with a great variety of possible color effects results in new decorative panels with special esthetic effects.

The structured plastic layer is excellently protected between the two plates from being damaged or soiled. The surfaces of the decorative panel are flat and easy to clean.

The object of the invention is also a method of producing a decorative panel comprising the steps of applying a plastic layer in a structured form to a lower carrier plate, applying one or more effect layers to the plastic layer, spacing therefrom an upper glass plate, and optionally filling the space between the lower carrier plate and the upper glass plate with transparent plastic.

The inventive method is characterized by simplicity and a great range of possible variations.

The space between the lower carrier plate bearing structured plastic layer and effect layer and the upper glass plate is preferably filled with transparent plastic. The bond of the two plates with plastic, preferably elastic plastic, attains the strength and reliability of a compound body. The decorative panels have no unattractive edge areas since the space can be filled in as far as the edge.

The effect layer preferably consists of a thin metal layer which has in special esthetic effects. It is also preferable to provide different kinds of effect layers side by side so that the decorative panel has a pictorial and multicolor effect.

The structured plastic layer should have high adhesive power for the effect layer so that the latter is not detached when further effect layers are applied.

The structured plastic layer is preferably made of transparent plastic so that the esthetic effect is primarily caused by the applied effect layers.

The invention shall be explained in more detail below with reference to the drawing showing an exemplary embodiment.

BRIEF DESCRIPTION OF THE DRAWINGS

The single figure shows a cross section through the inventive decorative panel.

DETAILED DESCRIPTION OF THE PREFERRED EMBODIMENTS

Structured plastic layer 4 is applied to lower carrier plate 2. The plastic layer bears various effect layers 5, 5'. Upper glass plate 3 is spaced from lower carrier plate 2, and also from the effect layer. Between plates 2, 3 a sealing strip 6 is provided in the edge area. Space 7 between plates 2, 3 is filled with transparent plastic 8.

The decorative panels can have any desired size, for example 50×100 mm or 100×200 mm.

Conventional flat glass of any desired width, for example 3 to 10 mm, is used for the glass plates. The glass plates may be colored.

The carrier plate may be made of any of a great variety of materials, for example glass, wood, metal or plastic. If a glass plate is used it may be metal-coated or provided with a color layer on the upper or lower side. Wooden carrier plates can be produced from a great variety of woods; for esthetic reasons it is particularly recommendable to use fine woods of all types, such as mahogany, teak, Brazilian rosewood and the like. Simple wooden plates and carrier plates made of metal can optionally be lacquered or provided with a color layer. If a plastic plate is used as a carrier plate it can likewise be provided with a color layer o be made of colored plastic.

The structured plastic layer should be made of a plastic that can be disposed on the lower carrier plate in a structured form by various techniques and modes of operation. Numerous commercial binders are suitable for this purpose, in particular those that remain glutinous after drying. This has the advantage that the effect layer adheres well to the plastic layer. An example is the water-soluble dispersion BASF 567. The consistency of the plastic material, more or less pasty, is adjusted by adding water or solvent depending on the application technique and desired structure.

The plastic can be given any desired structure or design. Some examples are ornaments, artistically designed pictures, letters and fully free designs.

The plastic is applied, for example, by means of a roller or brush. It may also be applied by silk screen printing. The plastic may be applied over only part of the surface of the carrier plate. It is preferable to use a plastic that is elastic after hardening.

One or more effect layers are applied to the structured plastic. Manifold colors and pigments are suitable for this purpose.

However, it is preferable to apply the effect layer using embossed sheets or heat-sealed sheets and also leaf gold. With embossed or heat-sealed sheets a metal layer, usually an aluminum layer, is transferred with or without a colored lacquer thereon to the substrate. For decorative panels heat is customarily not used; the metal layer is pressed on instead. It then adheres to the adhesive structured plastic layer. Various pressing tools can be used that can be handled like a brush or a spatula. However, the pressure can also be provided by structured or smooth rolls. One thus achieves a cold embossing technique as opposed to the customary hot embossing technique.

A second, or several different, effect layers can be applied in a simple way by exerting relatively little pressure for the first effect layer so that the latter is deposited only on the most elevated areas of the structured plastic. When more pressure is applied for the second and further effect layers, deeper places in the structured plastic are also reached. The areas coated with a first effect layer remain unchanged when a second effect layer is applied since the second effect layer no longer adheres to the areas already coated with the first effect layer.

Special effects are also achieved with effect layers having an opalescent or iridescent effect.

The space between the plates can be filled with a suitable transparent plastic. It is suitable to use in particular all those plastics that are customarily used in multilayer glass, for example the plastics UCB-A, UCB-15 and UCB-20. UV-hardening plastics are preferred. Thermally hardening epoxy resins can also be used.

The transparent plastic is customarily colorless. However, it may also be dyed.

When filling the space, which is preferably done in a vertical arrangement of the plates, it is advantageous to support the plates so that no bulges form. The space is preferably filled as far as the edge. This is attained, for example, by sealing the edge area with a sheet or the like, a pressure frame also being provided, and then filling it. The sealing means is removed after the plastic has hardened. The edge may be cut and polished so that the decorative panel has a flawless edge area.

One may also provide a plastic strip adhesive on both sides in the edge area between the two plates and then fill it in. With this mode of operation, however, an edge area arises.

The inventive decorative panels are particularly suitable for designing facades, as ceiling elements, as partitions and for tables.

I claim:

1. A decorative panel comprising:
   a lower carrier plate,
   a structured plastic layer applied to at least a portion of said carrier plate, said structured plastic layer having a variable height so that said structured plastic layer includes raised portions,
   an effect layer disposed on said raised portions of said structured plastic layer, said effect layer being capable of providing a visual effect, and
   an upper glass plate spaced from said effect layer.

2. The decorative panel of claim 1, further comprising a transparent plastic disposed adjacent to said upper glass plate and at least one of said effect layer, said structured plastic layer and said carrier plate.

3. The decorative panel according to claim 2, wherein said effect layer comprises a metal layer.

4. The decorative panel according to claim 3, further comprising a plurality of different effect layers provided on said structured plastic layer.

5. The decorative panel according to claim 2, further comprising an adhesive coating provided on said structured plastic layer for securing said effect layer.

6. The decorative panel according to claim 2, wherein said structured plastic layer is formed of a transparent plastic.

7. The decorative panel according to claim 1, wherein said effect layer comprises a metal layer.

8. The decorative panel according to claim 7, further comprising a plurality of different effect layers provided on said structured plastic layer.

9. The decorative panel according to claim 1 further comprising an adhesive coating provided on said structured plastic layer for securing said effect layer.

10. The decorative panel according to claim 1, wherein said structured plastic layer is formed of a transparent plastic.

11. A decorative panel comprising:
    a lower carrier plate,
    a structured plastic layer applied to at least a portion of said carrier plate, said structured plastic layer includes raised portions,
    an effect layer disposed on said raised portions of said structured plastic layer, said effect layer being capable of providing a visual effect, and
    an upper transparent plate spaced from said effect layer.

12. The decorative panel as defined in claim 11, wherein said upper transparent plate is glass.

13. The decorative panel as defined in claim 11, wherein said raised portions of said structured plastic layer can have variable heights.

14. A method of producing a decorative panel comprising the steps of:
    applying a plastic layer in a structured form to a lower carrier plate,
    applying an effect layer to the structured plastic layer,
    spacing an upper glass plate from the effect layer, and
    optionally filling the remaining space between the lower carrier plate and the upper glass plate with transparent plastic.

15. The method according to claim 14, further comprising the step of applying an additional effect layer to the structured plastic layer.

16. The method according to claim 14, wherein said step of applying an effect layer is done by cold embossing.

* * * * *